United States Patent

[11] 3,545,465

[72] Inventor Vijay K. Zadoo
Mount Prospect, Illinois
[21] Appl. No. 686,544
[22] Filed Nov. 29, 1967
[45] Patented Dec. 8, 1970
[73] Assignee Vapor Corporation
Chicago, Illinois
a corporation of Delaware

[54] PRESSURE REGULATOR
7 Claims, 4 Drawing Figs.

[52] U.S. Cl. ................................................. 137/38,
137/81, 137/116.5, 137/484.8, 137/505.18,
137/43
[51] Int. Cl. .................................................. F16k 17/36
[50] Field of Search ...................................... 137/39, 81,
116.5, 484.8, 43

[56] References Cited
UNITED STATES PATENTS
1,405,147  1/1922  Mueller ...................... 137/43

| | | | |
|---|---|---|---|
| 1,950,121 | 3/1934 | McKee | 137/484.8 |
| 2,583,006 | 1/1952 | Niesemann | 137/81 |
| 2,608,200 | 8/1952 | Stockman | 137/81 |
| 2,772,686 | 12/1956 | Versoy | 137/39 |
| 2,806,481 | 9/1957 | Faust | 137/116.5 |
| 2,879,783 | 3/1959 | Taplin | 137/116.5 |
| 3,204,657 | 9/1965 | Boyd | 137/116.5X |
| 3,251,376 | 5/1966 | Worden | 137/484.8 |
| 3,252,470 | 5/1966 | Elly | 137/81 |

*Primary Examiner*—Harold W. Weakley
*Attorney*—Norman Aon Witt

ABSTRACT: Pressure regulator for pressurizing pressure suits of aircraft personnel, whereby precise pressure regulation is maintained over a wide range of input pressures, temperatures and output flows, and including means for converting the output pressure from gage to absolute at a predetermined altitude.

PATENTED DEC 8 1970

INVENTOR
VIJAY K. ZADOO

BY *[signature]*

ATTORNEY

3,545,465

PRESSURE REGULATOR

This invention relates in general to a pressure regulator for use in aircraft to pressurize the pressure suits of aircraft personnel, and more particularly to a pressure regulator capable of precisely regulating pressure over a wide range of input pressures and output flows, and more particularly to a pressure regulator that automatically switches the output pressure from gage to absolute at a predetermined altitude.

The pressure regulator of the present invention includes a double port poppet-type valve that responds to a combined spring force and pressure force to regulate the flow through the regulator. A nozzle is arranged at the outlet of the regulator and intercommunicated by a capillary passage with a lower diaphragm chamber. A spring constantly works against the diaphragm and pressure in the lower diaphragm chamber, and essentially coacts therewith to regulate the poppet valve and flow of pressurized air through the regulator. An upper diaphragm coacts with the lower diaphragm and is responsive to pressure in a chamber that is normally atmospheric. A pilot valve actuatable by an evacuated bellows at a predetermined altitude converts the pressure in the upper diaphragm chamber from atmospheric to absolute when aircraft is at a predetermined altitude. This results in converting the output pressure of the valve from gage to a constant absolute pressure.

An acceleration compensator is provided to overcome acceleration loads induced during aircraft maneuvering. Means is also provided to vent the downstream pressure to the atmosphere if the valve becomes dead ended.

It is therefore an object of the present invention to provide a pressure regulator for pressurizing the pressure suits of aircraft personnel and to provide a precise pressure regulation over a wide range of input pressures and temperatures and output flows.

Another object of this invention is in the provision of a pressure regulator that is light weight, small in size, and capable of providing precise pressure regulation and a large flow capacity.

A still further object of the invention is to provide a pressure regulator that includes a pilot valve for automatically switching the output pressure from a gage pressure to an absolute pressure at a given altitude.

Another object of this invention resides in the provision of a pressure regulator that is unaffected by acceleration loads encountered during aircraft maneuvers.

Still another object of this invention is in the provision of a pressure regulator having means for regulating the pressure by sensing the true downstream pressure to enhance regulator performance.

Other objects, features and advantages of the invention will be apparent from the following detailed disclosure, taken in conjunction with the accompanying sheets of drawings, wherein like reference numerals refer to like parts, in which.

Figure 2:
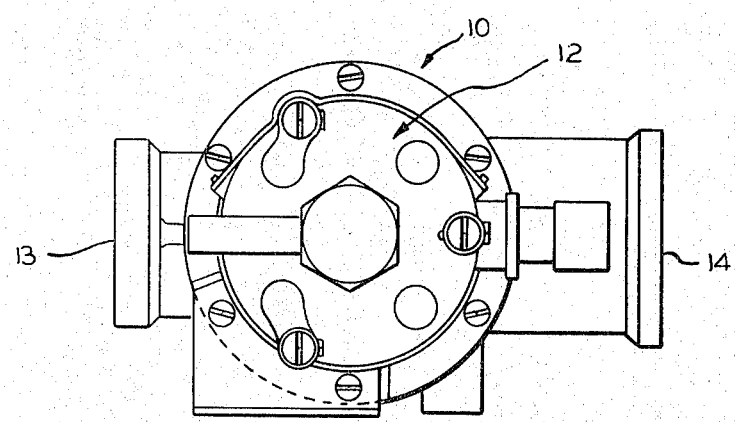
FIG. 2 is a top plan view of the pressure regulator shown in FIG. 1.
Figure 1:
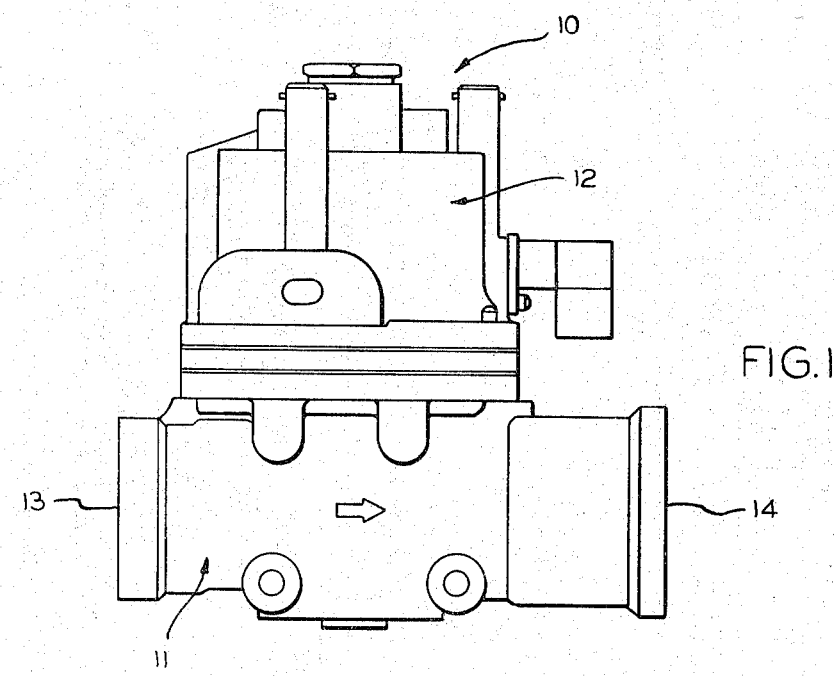
FIG. 1 is a front elevational view of the pressure regulator according to the present invention.

Referring now to the drawings, the pressure regulator of the present invention, generally indicated by the numeral 10, includes a main body 11 having a bonnet assembly 12 mounted thereon. The main body 11 includes an inlet 13 and an outlet 14. While the inlet and outlet are alined it would be appreciated that they could be arranged in any other suitable manner. The inlet is adapted to be connected to a pressure generator or a source of pressure that may vary over a wide range, and even vary temperaturewise. Thus, the input pressure of the regulator is at the inlet 13. The outlet 14 is adapted to be connected to one or more pressure suits of aircraft personnel for providing a regulated pressure thereto at a predetermined level even though the inlet pressure may vary over a wide range. Normally the regulator of the invention may be considered a gage pressure regulator, but means is provided and will be hereinafter described that is capable of automatically switching over to absolute pressure at the output and thereby causing the regulator to be an absolute pressure regulator.

Figure 3:
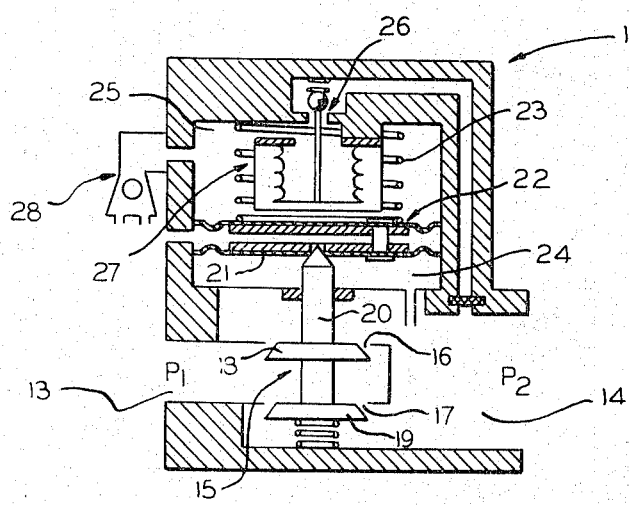
FIG. 3 is a schematic diagram of the pressure regulator according to the present invention.

For purposes of initially understanding the present invention, reference is made to the schematic diagram of FIG. 3, wherein the input pressure at the inlet 13 flows to a double port poppet-type valve 15 which includes upper and lower orifices 16 and 17 defining valve seats for upper and lower valve closure poppets 18 and 19. Both valve poppet closures 18 and 19 are mounted on a valve stem 20 that engages a lower diaphragm 21. An upper diaphragm 22, connected to move with the lower diaphragm 21, is continually subjected to the force of a main valve spring 23. A lower diaphragm chamber 24, intercommunicating with the output pressure or downstream end of the regulator functions to control the movement of the lower diaphragm 21 in response to the output pressure of the regulator. An upper diaphragm chamber 25 is normally at atmospheric pressure, but is placed at absolute pressure upon opening of a pilot valve 26 in response to actuation of a sensing bellows 27 when the aircraft reaches a predetermined altitude. An acceleration load compensating valve 28, associated with the upper diaphragm chamber 25, in response to acceleration loads, functions to throttle down the overboard dump of the pilot valve leakage, increase the pressure in the upper diaphragm chamber 25 and open the poppet valve 15 and thereby bring the output pressure back to its set point.

Figure 4:
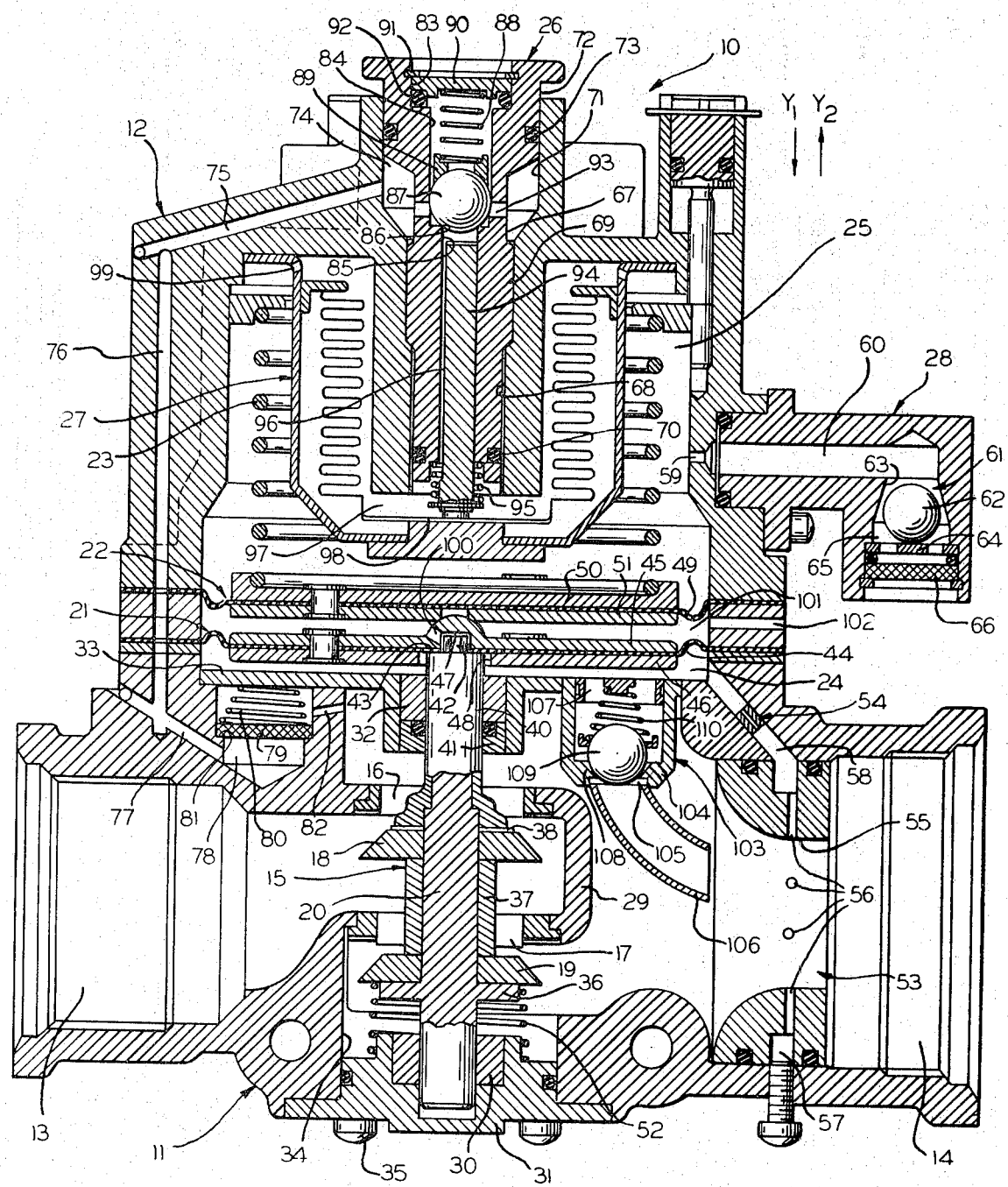
FIG. 4 is a vertical sectional view taken through the pressure regulator of the present invention and showing the parts in the normal unloaded position.

Referring now more particularly to FIG. 4, the regulator body 11 includes a wall or partition 29 that separates the input pressure side from the output pressure side of the regulator, and in which is located the upper and lower orifices or ports 16 and 17 of the double port poppet valve 15. The valve stem 20, having the poppet closures 18 and 19 mounted thereon is bearingly supported for axial movement by a bearing 30 set in cap assembly 31 at the lower end, and a bearing 32 set in a bearing plate 33 at the upper end. The cap assembly 31 is sealingly fitted into an opening 34 in the body 11 and held in place by a plurality of fasteners 35.

The valve stem 20 has an integral flange 36 near its lower end and against which abuts the lower valve poppet closure disk 19. A spacer 37 is arranged over the stem above the disk 19 to space therefrom the upper valve poppet disk 18. A shim 38 is arranged above the upper disk 18 and against which is secured an upper shaft 40. The upper shaft is in bearing engagement with the bearing 32 carried by the bearing plate 33. In order to seal along the valve stem at the upper end, a Teflon U-cup seal 41 is provided. Further, the bearing plate 33 is suitably fitted in sealing engagement on a shoulder formed at the upper end of the body 11.

The upper shaft 40 of the main valve stem 20 includes a diametrically reduced terminal portion 42 having milled flat sides defining air flow passages. An annular shoulder 43 is defined by the reduced terminal portion 42. The lower diaphragm 21, which is drivingly connected to the valve stem 20 at the upper shaft 40, includes a flexible member 44 stiffened at its center area by upper and lower stiffening or diaphragm plates 45 and 46. The upper stiffening plate 45 is formed at its center with a socket 47 to receive the reduced portion 42, while the lower stiffening plate 46 is provided with a clearance hole 48 to receive the upper end of the end member 40. Thus, the lower diaphragm 21 is effectively provided with a socket for receiving the upper shaft of the valve stem 20. The Teflon seal 41 on the upper shaft 40 prevents local high velocity jets coming through orifice 16 from sticking to the upper shaft 40, going through the bearing 32 and impinging on diaphragm plate 46 thereby giving the sensing diaphragm 21 a false value for controlling poppets 18 and 19.

The upper diaphragm 22 includes a flexible member 49 stiffened centrally by upper and lower stiffening plates 50 and 51 that are suitably connected together. The upper stiffening plate 45 of the lower diaphragm 21, having a raised portion in the center thereof is in continual engagement with the lower stiffening plate 51 of the upper diaphragm plate 22. The upper stiffening plate 50 defines a seat for the main valve spring 23 which is bottomed at the upper end within the bonnet assembly 12. Thus, the force of the spring 23 is transmitted to the valve stem 20 through the upper diaphragm 22 and the lower diaphragm 21. In order to maintain the valve stem 20 in continual engagement with the lower diaphragm 21, a helical compression spring 52 is provided which bottoms at its lower end on the cap assembly 31, and at its upper end against the lower disk 19.

The pressure in the lower diaphragm chamber 24 is the output pressure of the regulator or that at the outlet 14. In order to provide precise regulation, the true downstream pressure is sensed by diaphragm 21 through a nozzle 53 and a small capillary passageway 54. The small capillary 54 aids damping and stability. The nozzle 53 is arranged at the downstream end of the valve adjacent the outlet 14, and includes a flared opening 55 that is greatest in dimension at the inlet end and necked down at the outlet end. A plurality of circumferentially arranged and radially alined holes 56 are provided in the necked down area of the flared opening, and lead outwardly to an annular passageway 57. The passageway 57 is in turn alined with a passageway 58 in which the capillary passageway 54 is arranged and which communicates with the lower diaphragm chamber 24. Thus, the nozzle and capillary passageway coact to detect the true downstream pressure and deliver same to the lower diaphragm sensing chamber 24. Stability in operation of the regulator is obtained by use of the capillary passageway, thereby minimizing rapid fluctuations in movement of the valve 15. The regulator has to regulate the output pressure over a wide range of flows. When the flow is increased, the static pressure in the throat of the nozzle 53 drops more than in the outlet duct, and this aids in overcoming the droop effect and enhances the performance of the regulator.

The regulator is automatically switched over from the gage pressure regulator to an absolute pressure regulator at a predetermined altitude by operation of the evacuated sensing bellows 27 which in turn operates the pilot valve 26 arranged in the bonnet assembly 12. When the bellows 27 connects the upper diaphragm chamber 25 to the outlet pressure, it does not load the upper diaphragm chamber with full downstream pressure. It is in itself an absolute pressure regulator which uses downstream pressure as a source of pressure for regulating the upper diaphragm chamber at a fixed predetermined absolute pressure irrespective of changes in the atmospheric or ambient, unless the ambient increases beyond a certain level in which case the pilot regulator shuts off and the main valve once again becomes a gage pressure regulator. The sensing bellows 27 is mounted in the upper diaphragm chamber 25, and this chamber is normally at atmospheric pressure (with the pilot valve 26 closed) by means of communication with the ambient through a passageway 59 that is alined and communicates with a passageway 60 in the acceleration load compensating valve 28. The passageway 60 is normally open to the ambient through a ball valve 61 which remains open except when acceleration loads are induced in the $Y_1$ axis during aircraft maneuvers. The ball valve 61 includes a caged ball 62 coactable with a tapered ball seat 63. A perforated plate 64 prevents the ball 62 from falling out of the valve chamber 65, while permitting the ambient air to flow therethrough. A filter 66 is placed ahead of the valve chamber 65 to preclude the entering of contaminants in the compensator valve. The operation of the compensator valve will be hereinafter explained.

The pilot valve 26 includes a body 67 that is secured within a bore 68 in the bonnet assembly by coacting screw threads 69. An O-ring gasket 70 is arranged at the lower end of the body sealing it with the bonnet assembly. A stepped bore 71 of greater dimension than the bore 68 is provided at the upper end of the bonnet assembly and in communication with the bore 68 to receive the enlarged head 72 of the pilot valve body. An O-ring gasket 73 seals the head 72 with the bore 71. The head 72 is sized with the body 67 and the stepped bores 68 and 71 to define an annular chamber 74 within the bore 71 and below the head 72. This chamber communicates at one end with the downstream pressure of the regulator and the downstream output pressure chamber through connecting passageways 75, 76 and 77, a filter chamber 78 including a filter 79 biased by a spring 80 against a seat 81, and a passageway 82. The annular chamber 74 communicates with the upper diaphragm chamber 25 when the pilot valve 26 is open as will be more apparent upon further description of the pilot valve.

The pilot valve body 67 includes axial stepped bores 83, 84 and 85. A valve seat 86 is defined between the stepped bores 84 and 85 to coact with a ball 87 that is movable within the bore 84. A spring 88, within the bore 84, normally seats the ball 87 and continually urges a resilient force thereagainst. The spring 88 is bottomed at the lower end on a spring guide member 89 that in turn engages the ball 87, and on the upper end by a cap 90 that is received within the bore 83 and held in place by an internal retaining ring 91. An O-ring gasket 92 seals the cap 90 in the bore 83. Above the valve seat 86, a plurality of circumferentially spaced and radially arranged holes 93 provide intercommunication between the annular chamber 74 and the bore 85 when the ball 87 is unseated.

A valve stem 94 is slidably arranged within the bore 85 and biased in a direction away from the ball 87 by a spring 95. The valve stem 94 is flatted longitudinally at 96 to define with the bore 85 a passageway between the valve seat 86 and a chamber 97 defined by the pilot valve assembly and the evacuated sensing bellows 27. The lower end of the valve stem 94 is biased against an actuating plate 98 of the bellows which causes upward movement of the valve stem and unseating of the ball 87 when the bellows senses a predetermined altitude. A plurality of holes 99 are provided in the bellows support plate to intercommunicate the chamber 97 with the upper diaphragm chamber 25. Thus, unseating of the valve 87 will cause intercommunication between the outlet end 14 and the output pressure of the regulator, and the upper diaphragm chamber 25 that is at atmospheric pressure. This will result in causing the upper diaphragm chamber 25 to attain absolute pressure and cause the main poppet valve 15 to balance its output pressure (acting on the lower diaphragm) against the force of the set point spring 23 and a constant absolute pressure acting on the upper diaphragm 22. This will result in the output pressure of the valve becoming a constant absolute pressure.

When acceleration loads are induced in the regulator in the $Y_1$ axis, such affect the force balance on the diaphragms and cause the output pressure to decrease. These same acceleration loads cause the ball 62 in the acceleration compensator housing of the valve 28 to rise and partially or completely seat against the valve seat 63. This results in throttling down the overboard dump of the the pilot valve leakage, and increasing of the pressure in the upper diaphragm chamber 25 to cause the poppet valve 15 to open and thereby bring the output pressure at the outlet 14 back to its set point. While only an acceleration compensator has been shown for the $Y_1$ axis, it should be appreciated that another acceleration compensator could be added to compensate for acceleration loads in the $Y_2$ axis.

Should the valve be dead ended during service, the output pressure will increase and thereby cause the valve 15 to rise until the disks 18 and 19 engage the seats of the orifices 16 and 17. However, there is some seat leakage and the output pressure will thereby continue to increase, forcing the lower diaphragm 21 to rise and detach from the mating shoulder 43 on the valve stem 20. This opens a hole 100 formed in the upper stiffening plate 45 to intercommunicate the chamber 24 with a chamber 101 defined between the upper and lower diaphragms, and which is open to the atmosphere by a relief valve outlet 102. Thus, the lower diaphragm chamber 24 will be vented to the atmosphere. Inasmuch as the small size of the capillary passageway 54 is dictated by stability requirements, the capillary cannot pass all the valve seat leakage. Therefore, a capillary bypass valve 103 is provided to define a larger opening between the downstream chamber of the valve and the lower diaphragm chamber 24 when the chamber 24 has been vented to the atmosphere. The use of a capillary bypass valve 103 provides the capacity to dump seat leakage (during dead end service) in a high-performance regulator with an axially alined relief valve. The alternative is an independent relief valve communicating to the ambient whose set point is changed from a gage set point to an absolute pressure set point the same time the regulator changes. In our unit this is accomplished automatically with a reduction in number of parts. This bypass valve includes a housing 104 having an opening 105 at the lower end that intercommunicates with the downstream chamber of the regulator through a conduit 106, and an opening 107 at the upper end that intercommunicates with the lower diaphragm chamber 24. A tapered ball valve seat 108 is provided at the opening 105 to coact with a ball 109 that is spring biased thereagainst by a spring 110. When the lower diaphragm chamber 24 is vented to the atmosphere, the pressure on top of the bypass valve 103 is less than the pressure on the bottom thereof, which pressure differential acts on the ball 109 to lift it off its seat 108 against the force of the spring 110 and allow the leakage of the main valve 15 to be dumped overboard.

It will be understood that modifications and variations may be effected without departing from the scope of the novel concepts of the present invention.

I claim:

1. A pressure regulator for pressurizing pressure suits of personnel in aircraft comprising: a body having an inlet adapted to be connected to a source of pressure and an outlet adapted to be connected to a pressure suit; a modulating valve between the inlet and outlet controlling the flow therebetween and thereby regulating the output pressure at the outlet; upper and lower engaging diaphragms in said body defining upper and lower diaphragm chambers and a chamber therebetween, said diaphragms being drivingly connected to said valve for actuating same; spring means of a predetermined spring constant normally urging said valve open for maintaining the outlet pressure at a predetermined level; a nozzle at the outlet sensing the outlet pressure; a capillary passageway between said nozzle and lower diaphragm chamber intercommunicating same; vent means intercommunicating the upper diaphragm chamber with the atmosphere to normally maintain same at substantially atmospheric pressure; a pilot valve and passageway means between the upper diaphragm chamber and the outlet; an altitude responsive device in said upper diaphragm chamber for actuating said pilot valve automatically at a predetermined altitude to intercommunicate said upper diaphragm chamber and said outlet and thereby switch over the output pressure of the valve from gage to absolute pressure; means for venting to atmosphere said outlet if the modulating valve becomes dead ended to dump overboard valve leakage including means porting the chamber defined between said diaphragms to atmosphere; means porting the lower diaphragm to intercommunicate the lower diaphragm chamber and said atmospheric ported chamber when the pressure in said lower diaphragm chamber exceeds a predetermined level; and a capillary bypass valve independent of the capillary passageway between said lower diaphragm chamber and said outlet.

2. A pressure regulator as defined in claim 1, wherein said modulating valve includes a shaft having a valve closure means thereon coacting with an orifice to regulate flow between the inlet and outlet, and said spring means being helical and axially alined with said shaft.

3. A pressure regulator as defined in claim 1, wherein said modulating valve includes a shaft having a pair of spaced radially extending disk-shaped closures coacting with alined orifices to regulate flow between the inlet and outlet, and said diaphragms and spring means being axially alined with said shaft.

4. A pressure regulator as defined in claim 3, wherein said inlet and outlet are axially aligned.

5. A pressure regulator as defined in claim 3, and spring means urging said shaft into engagement with said lower diaphragm.

6. A pressure regulator as defined in claim 1, and an acceleration load compensating valve means in said vent means operable upon the occurrence of a predetermined acceleration force to close the vent means to effect an increase in pressure in the upper diaphragm chamber to maintain the output pressure at the outlet at a predetermined level.

7. A pressure regulator as defined in claim 6, wherein said acceleration load compensating valve includes means responsive to the pressure in the upper diaphragm chamber and the acceleration loads.